United States Patent [19]

Gaboriault

[11] Patent Number: 5,415,375

[45] Date of Patent: May 16, 1995

[54] CLOSING SYSTEM FOR CONTROLLING A FLOW WITH PRECISION

[76] Inventor: Jacques Gaboriault, 252 Allée du Rosaire, Rimouski, Quebec, Canada

[21] Appl. No.: 171,672

[22] Filed: Feb. 14, 1994

Related U.S. Application Data

[63] Continuation of Ser. No. 61,028, May 14, 1993, abandoned, which is a continuation-in-part of Ser. No. 885,034, May 18, 1992, abandoned.

[51] Int. Cl.⁶ .............................................. F16K 3/00
[52] U.S. Cl. ...................................... 251/158; 251/64; 251/193
[58] Field of Search ............... 251/158, 193, 188, 194, 251/64

[56] References Cited

U.S. PATENT DOCUMENTS

| | | | |
|---|---|---|---|
| 2,128,542 | 8/1938 | Snow | 251/158 |
| 2,131,051 | 9/1938 | Kinzie et al. | 251/158 |
| 3,130,951 | 4/1964 | Smith | 251/158 |
| 3,237,916 | 3/1966 | Bryant | 251/158 |
| 3,343,562 | 9/1967 | Combes | 251/158 X |
| 3,554,486 | 1/1971 | Thebado | 251/158 X |
| 3,907,250 | 9/1975 | Kane | 251/193 X |
| 4,089,505 | 5/1978 | Anderle et al. | 251/158 X |
| 4,238,111 | 12/1980 | Norman | 251/193 |
| 4,570,670 | 2/1986 | Johnson | 251/193 X |

*Primary Examiner*—John C. Fox

[57] ABSTRACT

The closing system has a closure member, and a carriage for translational displacement of the closing member along rails. A jack is mounted on the carriage for non-resilient axial displacements of the closure member to and from a flow opening. A damper transmits the vibrations of the closure member to the carriage and ensure axial displacement of the closure member. The closure member closes the flow opening by first axially aligning the closure member with respect to the flow opening by displacing the carriage. The jack axially displaces the closure member to urge the closure member against the flow opening to close it without translational displacement. The closure member is retracted away a minimal distance from the opening for clearance and then the carriage is actuated to reduce or enlarge the flow opening, with precision and without friction to a seal disposed about the opening.

4 Claims, 5 Drawing Sheets

CLOSING SYSTEM FOR CONTROLLING A FLOW WITH PRECISION

This is a continuation of application Ser. No. 061,028 filed May 14, 1993, now abandoned, which is a Continuation-in-part of application Ser. No. 885,034 filed May 18, 1992, now abandoned.

BACKGROUND OF THE INVENTION

1. Field of the Invention

This invention relates to a system for closing and opening to control with precision a flow of fluid, either gases and/or liquids, or finely divided loose materials. The invention relates in particular to a closing system having a closure member capable of withstanding relatively high pressures, and displaceable across the opening without imparting friction to surrounding sealing areas.

2. Description of Related Art

A gate wall is usually understood to include a closure member generally rectangular, a frame surrounding an opening, in which the closure member is disposed to slide therein and sealing strips are provided between the closure member and the frame. Major problems encountered with this type of construction are generally related to the absence of control regarding the compression of the closure member on its seat, since only the pressure or mass of the fluid acts on the closure member. Also, the friction exerted on the seal, results in seal wearing, deformation and leakages. Generally, leakage is controllable on the base portion of the seal; tightness being increased by increasing the vertical pressure exerted on the closure member. However, for the lateral sections, vertical pressure has no influence on the tightness of the lateral seals. This leakage problem is even more acute in the upper portion of the seal. Due to the sliding movement of the closure member, it is impossible to use sandwich seal strips.

In positive pressure situation, when the pressure is pushing a closure member against the opening, this type of construction is acceptable. However, when the pressure is negative, as the closure member moves away from the opening, serious leakage problems are encountered with the lateral and upper seals.

Also, in high negative pressure situations, it is difficult to close the opening until pressure equalization is obtained on both sides of the gate, generally by releasing the pressure in the conduit.

In U.S. Pat. No. 3,337,178 dated Aug. 22, 1967, Gordon teaches a valve for finely divided dry particulate materials. The valve is positively closed by a movement toward and away from a valve seat by providing leaf springs. The valve is operated by changing the convexity of the springs. Reproducibility is a function of the springs, which are resilient. Also, on increasing of convexity of the leaf springs, an oblique displacement of the closing member is obtained. This non-axial motion produces friction of the closing member on the valve seat and thereby wearing, deformation and deterioration of the seal.

In U.S. Pat. No. 4,524,950 dated Jun. 25, 1985, Vitas et al teach improved lateral seals by modifying their position, proposing oblique fixing with truncated V-shape seals to take advantage of the vertical pressure on lateral seals.

In U.S. Pat. No. 4,738,432 dated Apr. 19, 1988, Gardner et al teach two part sealing strips of sandwich type, consisting of a resilient layer and a superimposed bearing portion arranged to limit the maximum compression of the resilient portion in closed position.

In U.S. Pat. No. 4,204,662 dated May 27, 1980, Reynolds teaches a valve wherein a negative pressure, exerted on the closure member, is converted on the peripheral seal in a positive pressure by using a fulcrum which is located closer to the periphery than to its center. However, this approach does not solve the sealing problem of the upper joints or seals when rectangular closure member is used. Also, it is impossible to slide the closure member when a negative pressure is exerted over it.

In U.S. Pat. No. 2,999,666 dated Sep. 12, 1961, Sjogren teaches a valve having a circular closure member pivotally mounted along its side to an arm fixed to a stem, whereby the stem actuates a closure member.

In U.S. Pat. No. 2,767,956 dated Oct. 23, 1956, Rubin teaches a deformable diaphragm for another type of valve.

In Canadian Patent 1,036,571 dated Aug. 15, 1978, Connor et al teach special sealing means for sliding valves.

In Canadian Patent 803,875 dated Jan. 14, 1969, Combes teaches a valve with variable gauge portions.

SUMMARY OF THE INVENTION

The present invention provides a means to overcome at least some of the problems enumerated above.

According to a broad aspect of the present invention, there is provided a closing system for closing a flow opening of a flow conduit having a fluid of positive or negative pressure therein. The system comprises a substantially non-deformable closure member for closing the flow opening. The closure member has an axis of symmetry. A carriage is provided for translational displacement of the closure member to and from the flow opening. A non-resilient displacement means is provided for axially displacing the closure member to move same to and from the flow opening when disposed at a predetermined position to the opening. The non-resilient displacement means displaces the closure member against the flow opening for closing it and away therefrom, a minimal clearance distance, for opening the flow opening. A damper is connected to the closure member and independent of the non-resilient displacement means for confining and maintaining the closure member substantially perpendicular to axial displacement of the closure member and for damping vibrations imparted to the closure member by pressure acting thereagainst. The vibrations are transmitted to the carriage to absorb at least some of the vibrations directed toward the non-resilient displacement means. The carriage is slidably mounted and guided by a pair of guide rails. Each of the guide rails are disposed parallel to each other and aligned with opposed sides of the periphery of the flow opening. The guide rails support the carriage and resist forces exerted by a pressure flow in the flow conduit and acting against the closure member. Translational displacement means is also provided from moving the carriage along the guide rails to displace the closing member. The non-resilient displacement means is actuated independently of the translational displacement means whereby to urge the closure member against the flow opening, while inhibiting translational, side and rotational displacement of the closure member about the flow opening. The flow opening is opened by firstly actuating the non-resilient displacement means for axial displacement of the closure member away from the opening a minimal clearance distance and thereafter the translational displacement means displaces the carriage and closure member away from the opening to reduce or enlarge the opening with precision and without frictional displacement about the flow opening.

The vibrations on said closure member due to turbulence are dampened by the damper being always positioned at least within a minimal distance.

By "non-resilient means" throughout the disclosure and claims, it is meant elements which are non-elastic, non-springing and are accurately reproducible.

In a preferred embodiment, the system includes a sealing means cooperating between said closure member and the opening, whereby the means for axially displacing the closure member is actuated to displace the closure member against and away from the sealing means, without translational displacement of the closure member on the sealing means.

Preferably, the closing member is a cupola.

The closing system of the present invention is able to open with precision the closure member even when the negative pressure is high. Also, the closure member can be removed quickly in the front of the flow opening to permit a quick flow.

In a particular embodiment, an object of the present invention is to provide better sealing for a valve of the slide gate type, where the closure member never acts in friction by sliding on a seal surrounding the flow opening, but only in compression, thereby reducing wear, deterioration and deformation of the seal. Also as shown in the drawings a damper is provided for damping vibrations of the closure member toward the carriage. Other objects and advantages of this invention will be apparent from the accompanying drawings and descriptions.

BRIEF DESCRIPTION OF THE DRAWINGS

In the drawings which illustrate particular embodiments of the invention.

DESCRIPTION OF THE PREFERRED EMBODIMENTS

Figure 1:
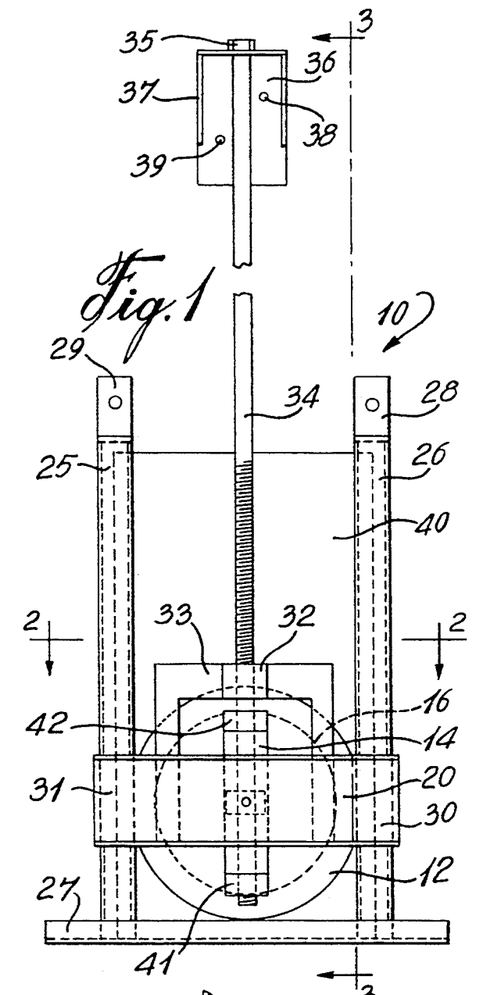
FIG. 1 is an elevation view of a closing system constructed in accordance with the present invention.

Referring to the drawings which illustrate some of the preferred ways of carrying out the invention, and particularly to FIG. 1, a valve closing system is illustrated generally at 10 and comprises a closure member 12 (preferably in the form of a cupola as will be discussed herein below), fixedly mounted on a non-resilient displacement means 14 for axial displacement of the closing member, to close a flow opening 16, better shown in FIG. 2. The closure member is substantially non-deformable or rigid.

Figure 3A:
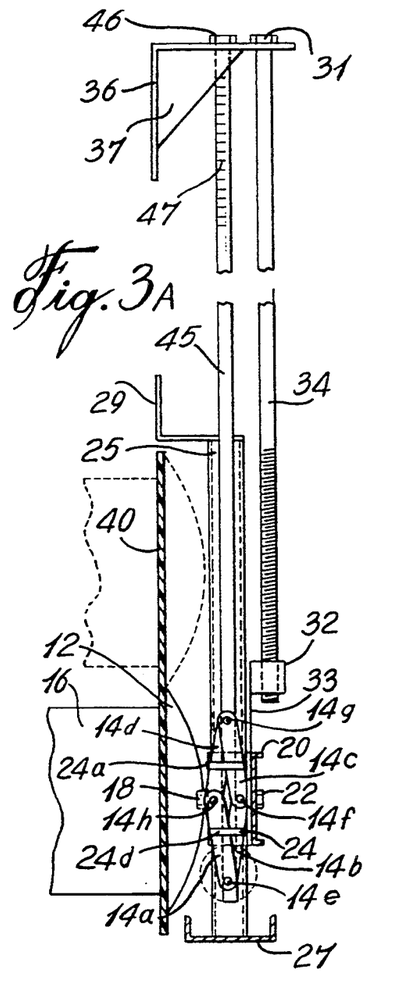
FIG. 3A is a cross-section taken along section lines 3—3 of FIG. 1.

This non-resilient displacement means is non-elastic and non-springing and may have numerous forms. In FIG. 1, and better shown in FIG. 3, the closure member 12 is fixedly mounted in its axis of symmetry or center to a type of jack 14 with a fastening means, for instance a bolt 18. The jack itself, is fixedly mounted to a carriage 20 with fastening means, such as bolt 22, between resilient washers sandwiched between the cupola. Aside from the stopping means such as 24 which act as a damper, as discussed in the following paragraph, the resilient washers also damp cupola vibrations and thus act as secondary or auxiliary dampers thereby protecting the jack components.

If desired as one of the examples only, pins, rods or other stoppers such as 24a, 24b, 24c and possibly 24d and more, are symmetrically mounted on a carriage 20 with respect to the axis of symmetry of the closure member. Other stopping means or dampers may be used as will be discussed herein below, to confine the axial displacement of the closure member such that any of the axial displacements is along an extension of the axis of symmetry of the closure member. The stoppers act as a damper to damp vibrations of the closure member, and directed them towards the carriage. The damper also maintains the cupola substantially perpendicular to its axial displacement axis and thereby reducing vibrations on the non-resilient displacement means. At least three stopper members are provided and may consist of pins, rods and other like dampers. These rod members are mounted on the carriage, in space relation to the closure member and disposed symmetrically with respect to the axis of symmetry of said cupola or closure member.

The carriage 20 is slidably mounted along a pair of sliding guide rails 25 and 26 defining the carriage track or sliding guide as well as acting as a supporting means to resist the force exerted against the closure member irrespective of whether the force on the closure member is subject to positive or negative pressures. The rails 25 and 26 are each secured in a channel 27 at one end and to brackets 28, 29 at the other end. In a particular embodiment, the carriage 20 slides to and from said flow opening on bushings 30, 31 (better shown in FIG. 2) and extending through the carriage. A positioning nut 32, better shown in FIG. 3, is secured to a bracket 33 fixed to the carriage 20 and receives a threaded stem which constitutes the translational displacement means.

The stem 34 is provided with a translational displacement control lever 35 which is seated or mounted on the supporting bracket 36. The bracket 36 is strengthened with fulcrums 37 which may be fastened to a wall by using holes 38, 39 or other fastening means. This translational displacement control lever 35 may be manual or motor operated.

A seal 40 cooperates between the periphery of the cupola or the closure member 12 for closing the flow opening, about its periphery. In a preferred embodiment, the seal is mounted on a wall surrounding the flow opening. The seal may be a medium or high density, high molecular weight polyethylene seal or a more resilient layer of foam material. Such seal may be fixed with an adhesive and sealant such as a urethane adhesive and sealant and the like. Sealing strips and other sealing means may be used. In some cases, the seal may not be necessary, for instance with relatively finely divided loose materials one can do away with the seal.

Figure 3B:
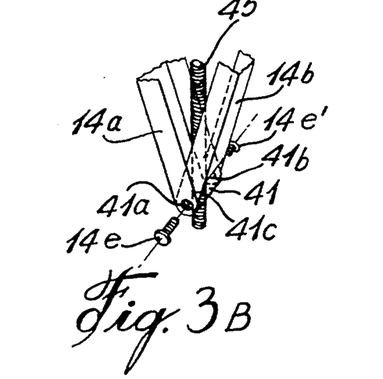
FIG. 3B is a perspective view of the lower end connection.

The jack may take various forms and may be provided by U-shaped arms 14a, 14b, 14c and 14d which are pivotally mounted about shafts, pivots, stub axles, bolts and the like 14e, 14e', 14f, 14f', 14g, 14g' and 14h, 14h', as illustrated, to define a parallelogram whose arms are axially displaceable without translational displacement by means of threaded female members 41 and 42 (better shown in FIG. 1) pivotally mounted about pivots, shafts, stub axles or bolts 14e, 14e', 14g, 14g': such as, a lozenge, a diamond or a square. The threaded female members 41 and 42 have holes 41a and 41b, and 42a, 42b to receive the pivots, shafts, stub axles, bolts and the like 14e, 14e' and 14g, 14g' and threaded holes 41c, 42c to receive a threaded stem 45. The portion of the stem 45 in the region near the threaded female member 41 (see FIG. 3B) and the portion of the stem near the threaded female member 42 pivot clockwise and the other counterclockwise in order to obtain axial displacement without translational displacement. Axial displacement is ensured by rotation of the adjusting element 46. At the free end of the stem 45, measuring marks 47 may be provided for fine tuning of the flow control in the conduit. The holes 41a, 41b, 42a, 42b are shaped as desired, for instance to receive stub axles or threaded to receive screws or bolts.

The U-shaped arm 14a may be pivotally mounted to the U-shaped arm 14b and to threaded female member 41 in numerous ways. For instance, as shown in circle of FIG. 3B, one side of the U-shaped arm 14a may be placed against one side of the U-shaped arm 14b, the pivot, shaft, stub axle or bolt 14e, pivotally mounted to said two sides, is fixed into hole 41a of the threaded female member 41. The other side of the U-shaped arm 14b joining the other side of the U-shaped arm 14a are pivotally mounted about pivot, shaft, stub axle or bolt 14e' with the pivot, shaft, stub axle or bolt being fixed into hole 41b of the threaded female member 41. Similar arrangements may be provided for the other pivots, shafts, stub axles or bolts 14g, 14g' receiving the threaded female member 42. Another method is to have one end of the arm 14a larger than one end of the U-shaped arm 14b whereby the side of the U-shaped arm 14b is positioned within the U-shaped arm 14a and the threaded female member 41 is positioned within the U-shaped arm 14b. The junction of U-shaped arms 14a, 14d is provided with pivots, shafts, stub axles or bolts 14h, 14h' and junction 14b, 14c with 14f, 14f' and are joined together as seen above. The jack 14 is an articulated parallelogram, articulated about pivots. A pair of opposite articulations has threaded female members mounted about pivots and fixed into this pair of opposite articulations. Threaded female members have respectively clockwise and counterclockwise threads and receive threaded stem 45 in order to produce symmetrical displacement and thereby, substantial axial displacement of the cupola 12. The term pivot is intended to mean axle joining the opposite sides of the U-shaped arms as well as, stub axles.

As shown in FIG. 3, the closure member which is in a closed position, is in open position upon rotation of the adjusting element 46 to increase the distance in size between the stub axles or bolts 14e, 14e' and thereby decreasing the distance between the stub axles or bolts 14f, 14f' and 14h, 14h' and producing a reduction of the compression generated axially against the sealing means and the closing member. Upon counter rotation of the adjusting element 46, the closing member is compressed and urged against the sealing means 40. In order to completely clear the flow opening, but with a minimal distance thereof, the adjusting element 46 is rotated to increase the distance in size between the stub axles or bolts 14e, 14e', 14g and 14g' until the closure member reaches, as shown in FIG. 2, the free ends of the pins 24a and 24c, ensuring this minimal clearance distance from the seal about the flow opening. The closure member is now restrained at a given position substantially perpendicular to the axial displacement of the closure member. The translational displacement control lever 35 is then rotated for sliding displacement of the closure member. The axial displacement is solely to close the flow opening or to clear the seal about the flow opening a minimal distance thereof. When the closure member is displaced by the carriage, the closure member should be as close as possible to the sealing means 40 without exerting friction on the seal which might cause deterioration of the seal. For closing systems used to control flow in outlets of sewers or water treatment plants containing pebbles or stones, in order to avoid the stones from lodging between the closure member and the sealing means, a clearance space of about 1–3 millimeters is provided. As is clearly seen from this operation, the closure member advances to a closed position without rotational displacement and inhibits translational side and rotational displacements. As is clearly seen from FIG. 2, the vibrations on said closure member due to fluid turbulence are dampened by said damper which is always within a minimal distance behind the closure member for damping vibrations imparted to the closure member 12. This damper, herein pins 24a, 24b, 24c, protect the non-resilient displacement means from axially displacing the closure member against stress or pressure exerted against the closure member. Accordingly, the closure member is damped from pressures or vibrations exerted on it and these pressures and vibrations are transmitted to the carriage.

The closing system or valve of the present invention may be used as a flow regulator, since the opening may partially close the opening. In such a case, the stem measuring marks 47 of FIG. 3 may be calibrated with precision with respect to the size opening. Moreover, this closure system or valve may be used to control alternatively two flow openings placed one next to the other.

Figure 4:
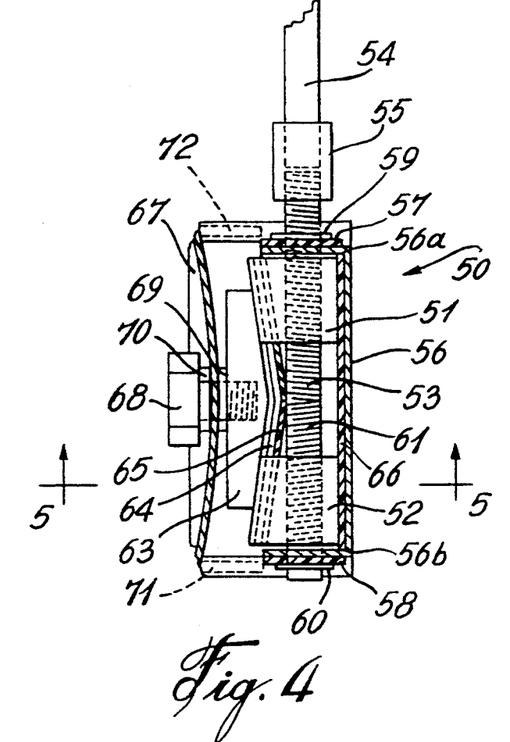
FIG. 4 is an enlarged side view of another preferred type of non-resilient means for axially displacing the closure member.
Figure 5:
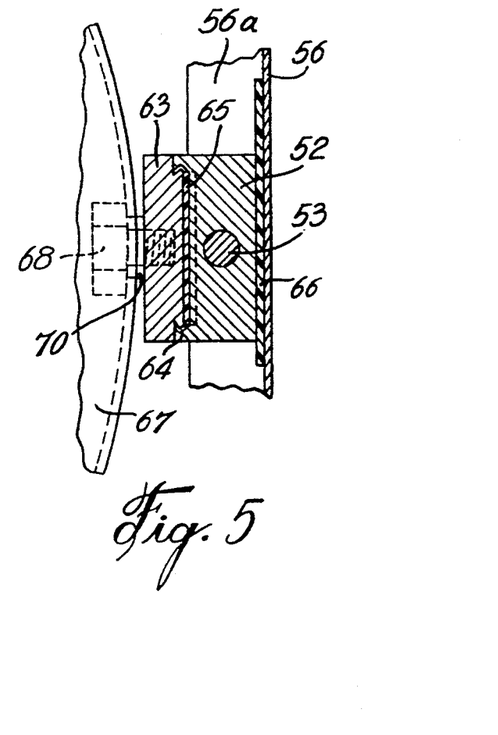
FIG. 5 is a detailed sectional view along section lines 5—5 of FIG. 4.
Figure 6:
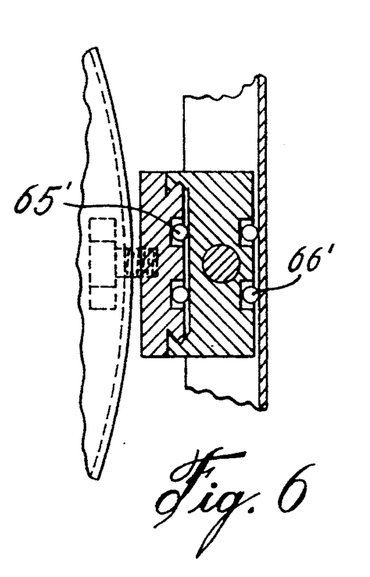
FIG. 6 is a view similar to FIG. 5 showing ball bearings instead of frictionless panels.

In another preferred embodiment shown in FIGS. 4 and 5, the jack 50 is comprised by beveled nuts 51, 52 axially displaceable and mounted respectively clockwise and counterclockwise about a threaded stem 53. The stem-extension 54 is secured to the stem 53 with coupling 55. The stem 53 is mounted onto a U-shaped carriage 56 through carriage wings 56a and 56b, respectively. The stem is rotatively mounted on the carriage 56 with retaining disks 57 and 58, provided with frictionless washers 59, 60 or ball bearings in order to ease rotation of the stem. The cupola 67 is secured to the rider 63 with bolt 68. The rider has, in his center, a threaded hole for receiving bolt 68. Bolt 68 is leakproof with resilient washers 69 and 70 sandwiched in between the cupola. These washers 69, 70 also provide some damping of vibrations exerted on the cupola and therefore protect the jack components. The rider abuts the beveled nuts 51 and 52 with rails or track 64, better shown in FIG. 5. In between the rider and the beveled nuts, frictionless panel 65 or ball bearings 65' (better shown in FIG. 6) or other compatible means to overcome friction is provided. Another frictionless panel 66 or ball bearings 66' (better shown in FIG. 6) or other means to overcome friction positioned between beveled nuts and carriage 56 ease the sliding movement of nuts on the carriage.

Figure 2:
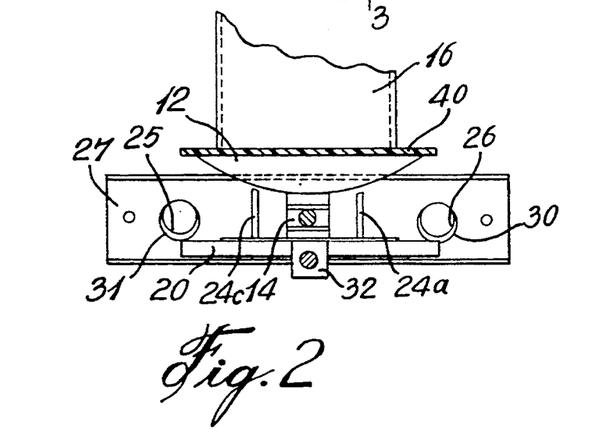
FIG. 2 is a detailed sectional view along section lines 2—2 of FIG. 1 with the closure member in closed position.

Instead of the pins 24 shown in FIGS. 2 and 3, if desired, the damper may also act as a stopping means and may consist of piston elements 72a and 72b. The pistons 72a and 72b have a male and female part operatively connected to the carriage and the other to the closure member. For example in each pin-tube or rod-tube arrangements, one of these elements is connecting the periphery of the cupola (the pin such as 72 in FIG. 4) and is slidable in or over the other element secured to the U-shaped carriage 56 (slidable in the tubes such as 72a and 72b in FIG. 7).

These dampers are used to confine and maintain the axial displacements of the cupola, to ensure proper axial displacement and to damp at least some of the vibrations imparted on the closure member, and directed towards said carriage, and to transfer or shunt the vibrations from said closure member or cupola to the carriage. The damper extends the life of the non-resilient displacement means by shunting the vibrations from the cupola to the carriage.

Figure 7:
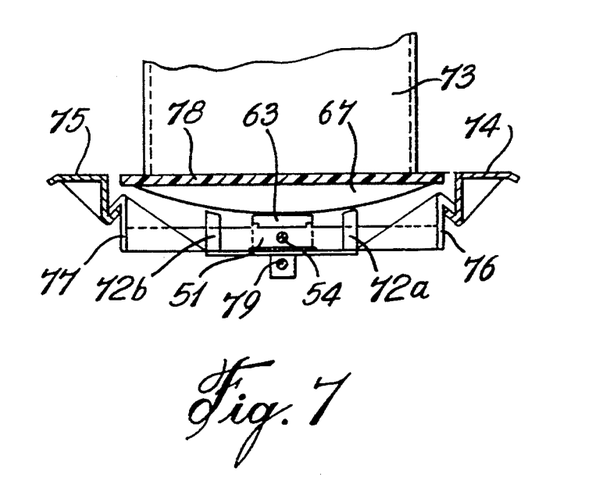
FIG. 7 is a top plan view of a closing system using means for axially displacing the closure member shown in FIG. 4.

It should be noted that the minimal distance for clearance of the closure member is given by the female elements, for instance the tubes such as 72a, 72b, which stop short of the cupola, as seen in FIGS. 7 and 4.

Rotation of the stem 53 generates the axial displacement of the rider 63. The rider has, opposite to the cupola 67, a V-shaped surface. The apex of the V-shaped surface and the cupola center are in the same axis of symmetry. The rider slides into beveled nut rails 64 and is confined thereto. The beveled nuts, taper toward the same axis of symmetry, upon a clockwise or counterclockwise rotation of the stem 53 and are displaced symmetrically away from each other or toward each other, with respect to the same axis of symmetry, producing the axial displacement of the cupola 67. As shown in FIG. 7, the carriage 56 is slidably mounted on the sliding guide rails 74 and 75, acting simultaneously as a supporting means to absorb the force exerted against the cupola 67, irrespective if the force is caused by positive or negative pressures. In order to avoid undue repetition, the sliding guide rails 74 and 75 will be described below with respect to the sliding guide rails 123 and 124.

Figure 8A:
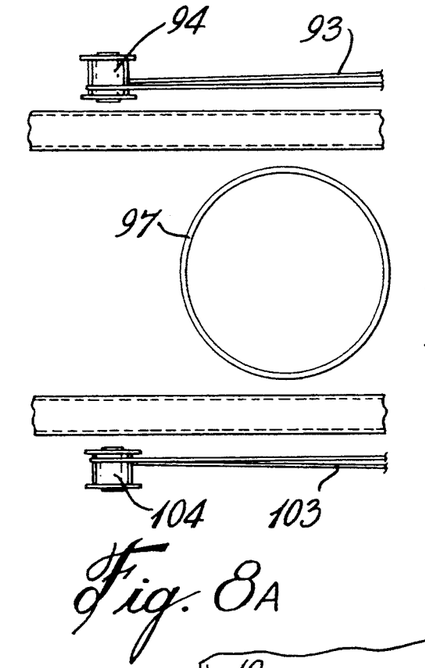
FIG. 8A is a side elevation view showing a flow opening and part of a closing system.
Figure 8B:
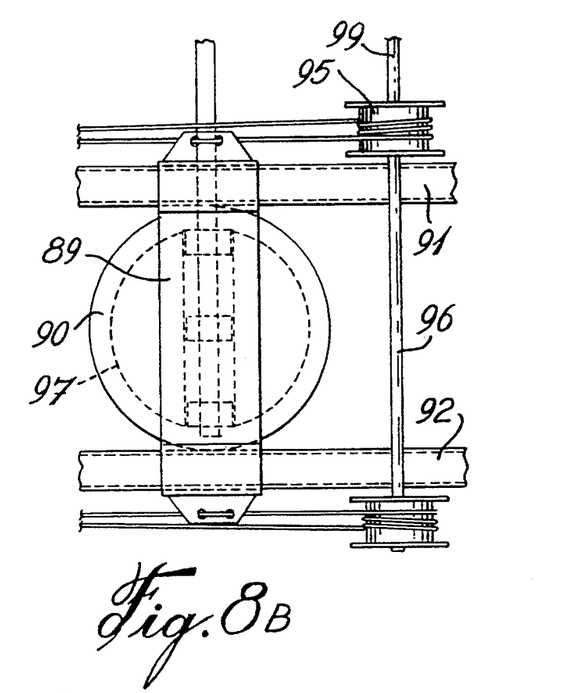
FIG. 8B is a view similar to FIG. 8A showing the closing system in position.

As shown in FIGS. 8A and 8B, a flow opening 97 is herein shown in an opened and closed condition, with the closure member 90 moved either vertically or horizontally to cover and seal the opening as shown in FIG. 8B or partly close it. The closure member 90 is mounted on the carriage 89 which is displaced on guide rails 91, 92, herein shown horizontally mounted on a surrounding wall. The translational displacement may be obtained with a mechanism comprising a pair of members which may be drive belts, endless chains or cables 93 wound about idle and drive pulleys 94 and 95. The pair of pulleys 94, 95 are synchronized by the rotation of the shaft 96 mounted across the rails. Shaft 96 may be operated with a hand crank or a motor drive secured thereto at an end 99.

The non-resilient means for axially displacing the closure member 90 need not be a jack of the type described above, although preferred, but could be mechanical means, including cam, or fluid operated including hydraulics and pneumatic systems. As shown in FIGS. 10 to 12, a screw-jack type translational displacement device is used as an alternative mechanical system in association with a diffusing ring 103. The ring 103 is secured, about one of its open ends, to the back wall of the cupola 102 9A.

The diffusing ring 103, see FIG. 10B, is provided at its opposed open end with radial elements such as 103a, 103b, 103c, 103d equally disposed such that a uniform pressure about the central portion of the ring is equally distributed along the periphery of the ring and thereby equally distributed on the cupola secured thereto.

Figures 9A, 9B:
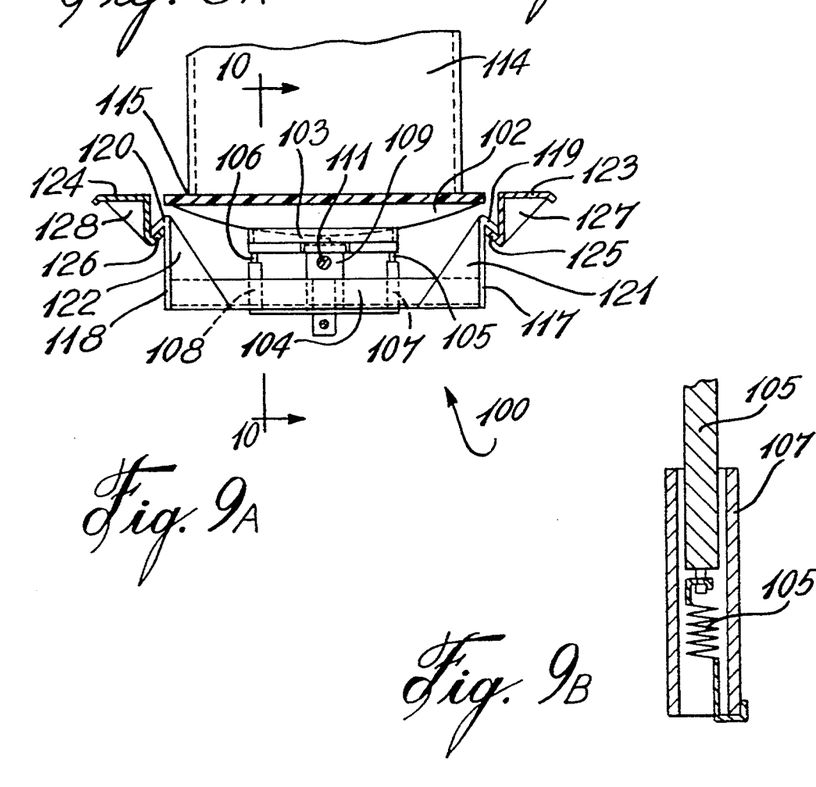
FIG. 9A is a top plan view of a closing system using another type of sliding guide and means for axially displacing the closure member.
FIG. 9B is an enlarged view of a damping connection.
Figures 10A, 10B, 11, 12:
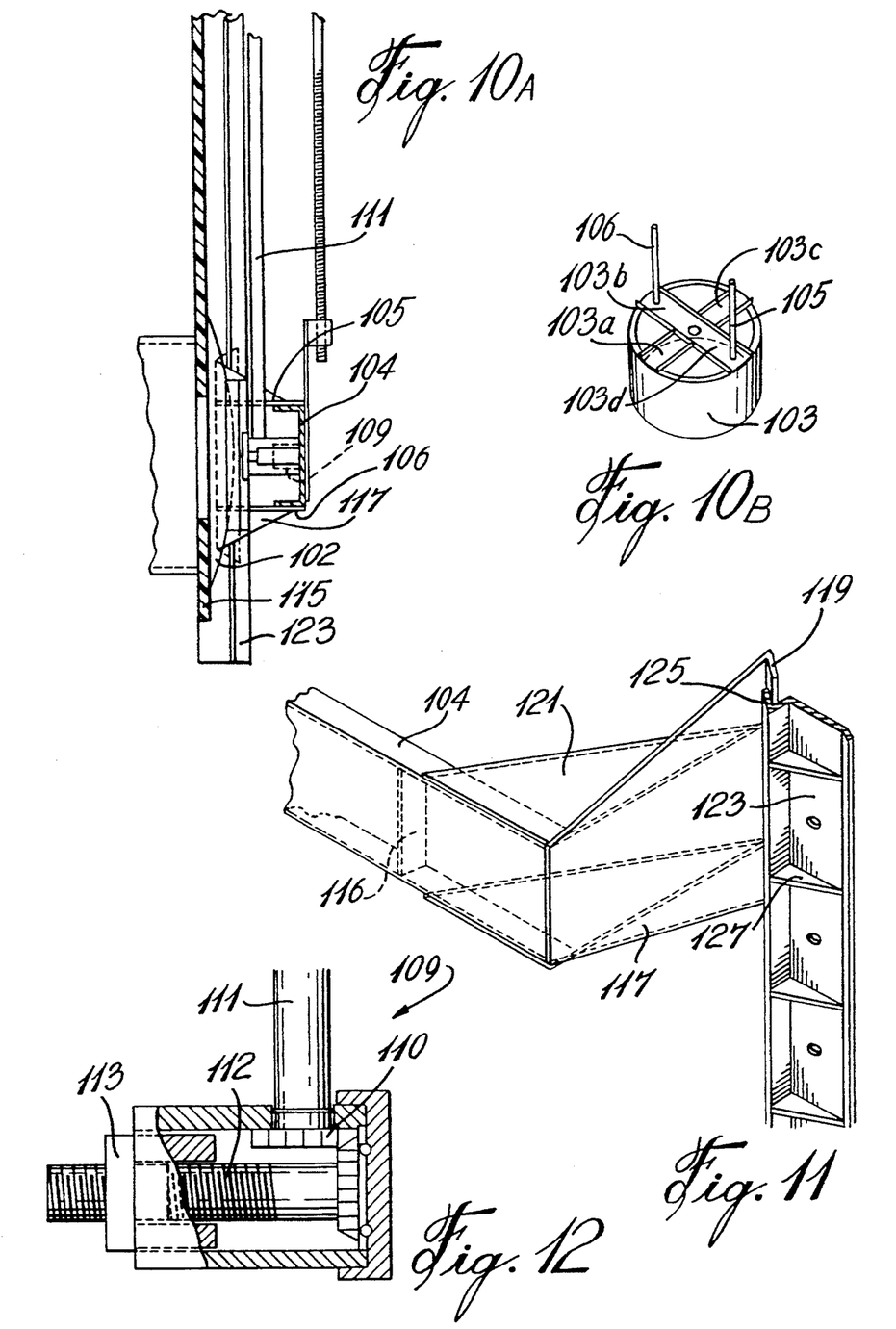
FIG. 10A is a detailed sectional view along section lines 10—10 of FIG. 9A.
FIG. 10B is a perspective view of the diffusing ring.
FIG. 11 is an enlarged perspective view of a portion of a slide guide rail of FIG. 9A.
FIG. 12 is an enlarged side elevation view of the screw-jack of FIG. 9A.

As shown in FIG. 9A, this diffusing ring 103 is slidably or telescopically connected to the carriage 104 by fastening means such as pins or rods 105, 106 symmetrically disposed and received in female elements such as tubes 107, 108 (see FIG. 9B) secured to the carriage. The rods 105 and 106 are connected to the tubes 107 and 108 by a resilient element, such as spring 105a. The jack 109 is axially mounted and fixed on the carriage and extends inside the ring 103. The diffusing ring 103 independently thereof reduces overloading on the jack by the closure member when subjected to vibrations caused by the turbulence of high pressure fluids present at the opening 97.

The diffusing ring and the jack arrangement maintain the cupola substantially perpendicular during axial displacement of the closure member and ensure the axial displacement. The ring dampens vibrations from the closure member and transfers at least some of the vibration forces through the rods 105 and 106 received in the tubes 107 and 108 connected to the carriage, from the closure member to the carriage, thereby extending the life of the non-resilient displacement means, namely the jack.

It should also be noted that inversely, the pins or rods 105 and 106 might be secured to the carriage and the tubes 107 secured to the diffusing ring.

If the pressure exerted against the cupola 102 is high, the cupola will automatically be pushed away by the pressure. If the pressure is low, biasing means such as spring 105a, (as shown in FIG. 9B) will act on the closing member.

The non-resilient displacement means for axially displacing the cupola is disposed along the axis of symmetry of the cupola and the ring is displaceably secured to the carriage and acts as a vibration damper.

As shown in FIGS. 10 and 12, the screw-jack 109 is fixedly mounted onto the U-shape frame of the carriage 104. It is actuated via one wheel of a gearing system, herein bevel gear 110, by actuating a connecting rod 111 which has a manually operated handle or a motor operated system (not shown) at a free end thereof. A threaded stem 112 is fixed to the other wheel of the gearing system causing axial displacement of the threaded piston 113. The piston 113 pushes on the diffusing ring at its center, axially displacing the closing member 102 with respect to the flow opening 114, without translational displacement.

Instead of the screw-jack, a fluid operated jack, having a positive driving action to axially displace the closing member to and from the flow opening, could be used.

A sealing means 115 cooperates between the closing member and the flow opening.

As shown in FIGS. 9A and 11, the carriage 104 is provided with reinforcing beams such as shown at 116 which may join the opposite inner sides of the U-shaped frame. Two parallel brackets 117 and 118 are fixedly mounted along one of their respective longitudinal ends, onto the opposite outer sides of the U-shaped frame of the carriage 104 (see FIG. 9A), and a flange 119 and 120 is formed at their respective outermost free ends by bending the bracket outwardly at an obtuse angle, so as to define a V-shaped cross-section at the free ends. Reinforcing brackets 121 and 122 respectively cooperate to strengthen the V-shaped cross-sections at the free ends.

The two parallel rails or sliding guides 123 and 124 are fixedly mounted onto a wall surrounding the flow opening. Each of the rails or guides has a flange 125 and 126 along one of its longitudinal ends bent outwardly at an obtuse angle corresponding to the obtuse angle of the flanges 119 and 120, as to define a V-shaped cross-section for confining flanges 119 and 120 within the flanges 125 and 126 as well as enabling sliding thereon and as resistance element against forces exerted on the cupola. Fulcrums 127 and 128 strengthen the "V" parts of those rails. Although reference is made to V-shaped rails, it should be understood that U-shaped or other tongues and grooves may be used, if desired. Also other sliding guides or railing systems may be used for confining the carriage, enabling sliding thereof and acting as supporting means to support said carriage and thereby to resist a force exerted by a flow against the closure member.

Figure 13A:
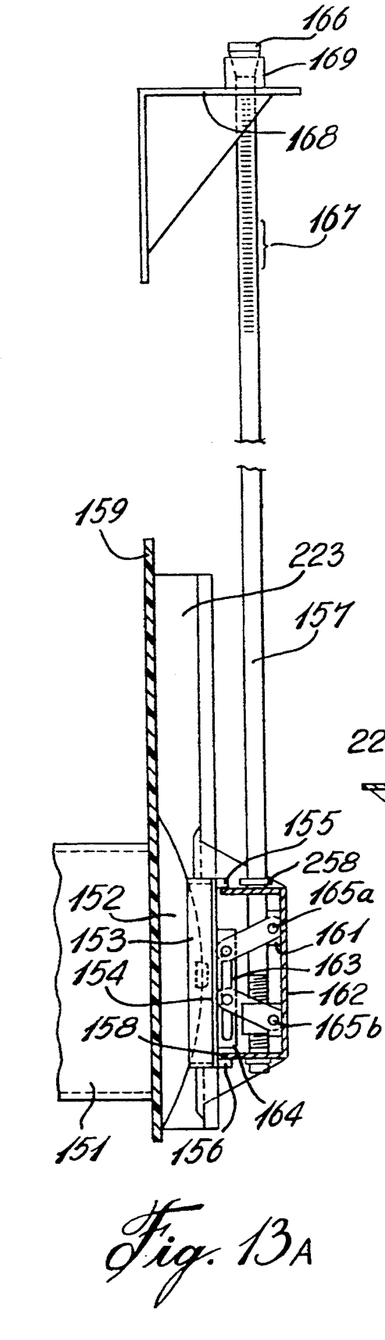
FIG. 13A is a side view of another preferred type of a valve closing system.
Figure 13B:
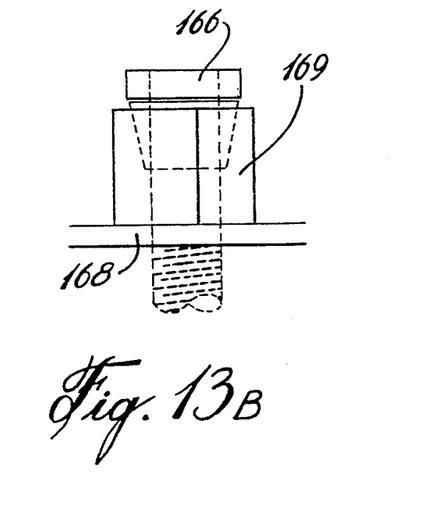
FIG. 13B is an enlarged view of the top end of the displacement rod.
Figure 14:
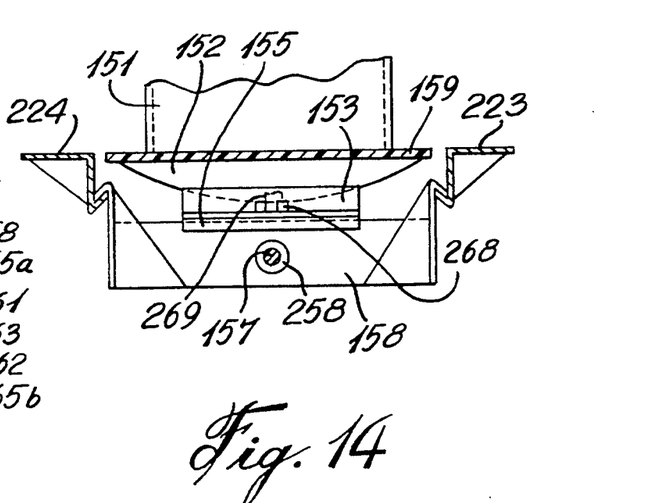
FIG. 14 is a top view of FIG. 13A.

In FIGS. 13A, 13B and 14, for closing the flow opening 151, a cupola 152 is axially fixed to a plate 154. A diffusing ring 153 which may be non-resilient or slightly resilient, is positioned between the cupola 152 and the plate 154. The ring 153 has opposite open sides, one of the opposed open sides being coaxial with the axis of symmetry of the cupola and fixed thereto by the fastening device 269 which comprises a nut and bolt with a single resilient washer 268. The ring on the other of the opposite open sides is slidably mounted on a carriage 158. The plate 154 which is a part of the damper, as will be explained herein below, comprises opposite parallel walls or extensions 155, 156 extending outwardly from the cupola. These walls may be integral with the plate or fastened to the plate. As an example only, the walls may be ultra-high molecular weight polyethylene and the like.

The non-resilient displacement means to axially displace the cupola has a threaded rod or stem 157 rotatably mounted through opposite walls of a U-shaped carriage 158 by means of retaining disks 257 and 258. A pair of blocks 161 and 162, at least one of the blocks, e.g. 162, is provided with inner threads for engaging the threaded rod 157. These blocks are operatively connected, via their respective links 165a, 165b provided at both ends with a shaft, to a pushing block 163 slidably between L-shaped slotted guides 164 secured to the plate 154 and urge the pushing block against the plate 154 and thereby the cupola. One shaft of each link extends through the pushing block 163 and the slot of the guides 164. It should be noted that the other block e.g. 161, may either be eliminated by directly joining the link to the carriage 158 or be secured to the carriage as shown in FIG. 13. It may also be provided with inner threads for engaging the threaded rods 157, and in such a case one of the blocks has clockwise and the other counterclockwise threads and functions as previously described with respect to the stem of the non-resilient displacement means which axially displaces the cupola of FIG. 3. The rod at its end opposite the carriage, is threaded and slidable through a supporting bracket 168, with the threaded end receiving a double action bolt. This double action bolt comprises a first bolt element 169 used for displacing the carriage and a second bolt element 166 preferably in the form of a truncated cone, for releasably locking or fastening the first bolt element 169 to the stem or rod 157. Upon rotation, it axially displaces the cupola, and upon sliding of the stem it displaces the carriage. The same rod operates independently of the carriage and the non-resilient displacement means for axially displacing said closure member.

The carriage 158 is slidably mounted and withheld in rails 223, 224 which are similar to the rails 123, 124 of FIG. 11 described herein above, but other rails to withhold and to slide the carriage may be used.

The damper comprises the free end of the opposite walls of the U-shaped carriage 158 receiving respectively the opposite walls or extensions 155 and 156 of the plate 154 to enable sliding of said opposite walls or extensions over said U-shaped carriage. The gap between the plate 154 and the free end of the opposite walls of the U-shaped carriage 158, when the cupola is closed, determines the minimal distance of clearance of the cupola. This damper maintains the cupola substantially perpendicular to any axial displacement of the cupola and ensures the axial displacement and damping of vibrations imparted to the cupola and directs at least some of the vibration forces towards the carriage.

If desired, instead of the diffusing ring 153, rods, pins, tubes or other discontinuous protruding elements may be used for equally distributing to the plate 157 some of the forces exerted against the cupola towards the non-resilient displacement means to axially displace the cupola.

With the present closing system, the counter pressure exerted on the closure member is more effective to close the flow opening compared to the conventional one. The force or pressure exerted is more equally distributed, even more so when a cupola is used instead of a rectangular gate. It should be appreciated that without the damper the non-resilient displacement means, to axially displace the cupola, would have a relatively short life expectancy as the cupola would tend to move in all directions. The seal means would also deteriorate.

In accordance with this invention, a new method to close a closing member of the gate wall type valve is obtained by providing a substantially non-deformable cupola for closing a flow opening. A carriage is provided for translational displacements of the cupola. Means is mounted on the carriage to axially displace the cupola to and from the flow opening and a damper is resiliently mounted on the carriage and is responsive to vibration of the cupola. Actuating the displacement means axially displaces the cupola, to and from the flow opening, for closing it or away a minimal distance thereof for clearance from the flow opening. The damper confines the cupola substantially perpendicular during the axial displacement of the cupola, and damping vibrations by directing them towards the carriage.

What is claimed is:

1. A closing system for closing a flow opening of a flow conduit having a fluid of positive or negative pressure therein, said system comprising:

a substantially non-deformable closure member for closing said flow opening, said closure member having an axis of symmetry, a carriage for translational displacements of said closure member to and from said flow opening, non-resilient displacement means for axial for displacement of said closure member to move same to and from said flow opening when disposed at a predetermined position to said opening, said non-resilient displacement means displacing said closure member against said flow opening for closing it, and away therefrom a minimal clearance distance prior to translatory displacement for opening said flow opening, a damper connected to said closure member and independent of said non-resilient displacement means for confining and maintaining said closure member substantially perpendicular to axial displacements of said closure member and for damping vibrations imparted to said closure member by pressure acting thereagainst, said damper having connecting elements secured thereto and resiliently connected to said carriage to tranfer said vibrations to said carriage thereby causing said carriage to absorb at least some of said vibrations directed toward said non-resilient displacement means, said carriage being slidably mounted and guided by a pair of guide rails, each of said guide rails being disposed parallel to each other and aligned with opposed sides of the periphery of said flow opening, said guide rails supporting said carriage and resisting forces exerted by a pressure flow in said flow conduit and acting against said closure member, translational displacement means for moving said carriage along said guide rails to displace said closing member, said non-resilient displacement means being actuated independently of said translational displacement means to urge said closure member against said flow opening, while inhibiting translational, side and rotational displacements of said closure member about the flow opening, said flow opening being opened by firstly actuating said non-resilient displacement means for axial displacement of said closure member away from said opening a minimal clearance distance and thereafter said translational displacement means displaces said carriage and closure member away from said opening to reduce or enlarge said opening with precision and without frictional displacement of said closure member about the flow opening.

2. A closing system as claimed in claim 1, wherein said closure member is secured to said damper, said damper being a diffusing ring, said ring having opposed open ends one of said opposed open ends being coaxial with said axis of symmetry and secured to said closure member, the other of said opposed open ends being displaceably connected to said carriage for translational movement, said non-resilient displacement means being disposed along said axis of symmetry of said closure member, and extending inside said ring which is concentric thereabout.

3. A closing system as claimed in claim 2, wherein said closure member is secured to said damper, said damper being a diffusing ring, said ring having opposed open ends one of said opposed open ends being coaxial with said axis of symmetry and secured to said closure member, the other of said opposed open ends being displaceably connected to said carriage for translational movement, said non-resilient displacement means being disposed along said axis of symmetry of said closure member, and extending inside said ring which is concentric thereabout.

4. A closing system as claimed in claim 2, wherein said translational displacement means is a stem having opposite stem ends, one of said stem ends being rotatably mounted on said carriage and operatively connected to a rotational shaft to impart axial rotation of said stem and axial displacement of said closure member.

* * * * *

UNITED STATES PATENT AND TRADEMARK OFFICE
CERTIFICATE OF CORRECTION

PATENT NO. : 5,415,375
DATED : May 16, 1995
INVENTOR(S) : Jacques Gaboriault

It is certified that error appears in the above-identified patent and that said Letters Patent is hereby corrected as shown below:

Abstract, line 7, change "ensure" to --ensures--.

Column 1, line 47, after "close" insert --or open--.

Column 3, line 22, delete "open" and insert --close--.

Column 6, line 54, after "24c", insert --24d--.

Column 8, line 27, after "102" insert --(see Fig.9A)--; and on line 42, after "103", first occurence, insert --independently thereof--; and after "103", second occurence, delete --independently thereof--.

Column 11, line 21, delete "for", second occurence; and on line 38, delete "tranfer" and insert --transfer--.

Column 12, delete lines 19 to 29 and insert --a sealing means is provided between said closing member and said flow opening, said non-resilient means for axial displacement of said closing member moving said closing member against and away from said sealing means without translational displacement of said closure member on said sealing means."

UNITED STATES PATENT AND TRADEMARK OFFICE
CERTIFICATE OF CORRECTION

PATENT NO.  : 5,415,375
DATED       : May 16, 1995
INVENTOR(S) : Jacques Gaboriault It is certified that error appears in the above-indentified patent and that said Letters Patent is hereby corrected as shown below:

Column 12, line 42, delete "2" and insert --3--.

Signed and Sealed this

Twelfth Day of December, 1995

Attest:

BRUCE LEHMAN

Attesting Officer

Commissioner of Patents and Trademarks